United States Patent
Masaki (10) Patent No.: US 7,065,012 B2
(45) Date of Patent: Jun. 20, 2006

(54) OPTICAL STORAGE DEVICE AND EMISSION CONTROL METHOD

(75) Inventor: Takashi Masaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 465 days.

(21) Appl. No.: 10/367,313

(22) Filed: Feb. 14, 2003

(65) Prior Publication Data

US 2003/0231563 A1 Dec. 18, 2003

(30) Foreign Application Priority Data

Jun. 14, 2002 (JP) ............................. 2002-174418

(51) Int. Cl.
G11B 7/00 (2006.01)
G11B 7/85 (2006.01)
G11B 7/125 (2006.01)

(52) U.S. Cl. ................ 369/44.29; 369/116; 369/13.24; 369/13.26

(58) Field of Classification Search ............ 369/44.29, 369/13.24, 47.5, 53.26, 121, 116, 44.12, 53.28
See application file for complete search history.

(56) References Cited

U.S. PATENT DOCUMENTS 5,386,409 A * 1/1995 Yokota et al. ............... 369/116
5,495,456 A * 2/1996 Oka et al. ................. 369/13.24
5,566,142 A * 10/1996 Nakano et al. ............. 369/122
6,304,533 B1 10/2001 Toda et al. ............... 369/47.51
6,421,314 B1 * 7/2002 Maruyama ................. 369/116
6,671,248 B1 * 12/2003 Miyabata et al. ........... 369/116
6,721,261 B1 * 4/2004 Kaku et al. ................. 369/116
6,731,584 B1 * 5/2004 Nagara ........................ 369/116

FOREIGN PATENT DOCUMENTS

| JP | 2-297731 | 12/1990 |
|---|---|---|
| JP | 5-120715 | 5/1993 |
| JP | 5-197994 | 8/1993 |
| JP | 2000-163782 | 6/2000 |

* cited by examiner

Primary Examiner—William Korzuch
Assistant Examiner—Kim-Kwok Chu
(74) Attorney, Agent, or Firm—Greer, Burns & Crain, Ltd.

(57) ABSTRACT

An optical storage device decreases the influence of return light to the laser light source and prevents an increase of power consumption even if high frequency superimposing is performed. The optical storage device applies drive current, to which a high frequency signal is superimposed, to the laser light source, and reads/writes data from/in the storage medium. The high frequency superimposing is set to OFF as a default to save power consumption, and high frequency superimposing is turned ON only when it is judged that servo is unstable, and high frequency superimposing is turned OFF when it is judged that servo is stable.

15 Claims, 11 Drawing Sheets

OPTICAL STORAGE DEVICE AND EMISSION CONTROL METHOD

BACKGROUND OF THE INVENTION

1. Field of the Invention

The present invention relates to an optical storage device and emission control method for recording and regenerating information on and from a storage medium.

2. Description of the Related Art

The advancement of technology in the information recording field is remarkable, and research and development are energetically progressing for magneto-optical disk memories, optical disk, and optical cards in terms of high density recording and regeneration, and high-speed access. In such optical storage devices, a laser diode is often used for the light source.

Figure 13:
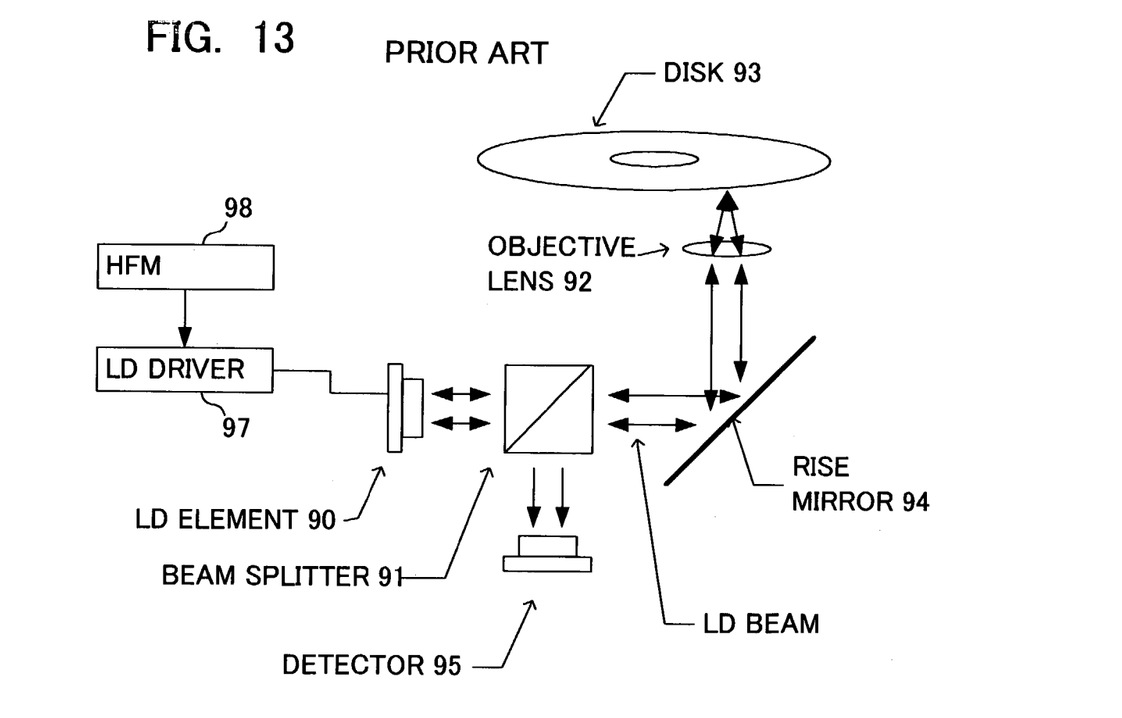
FIG. 13 is a diagram depicting high frequency superimposing of a conventional disk drive.
Figure 14:
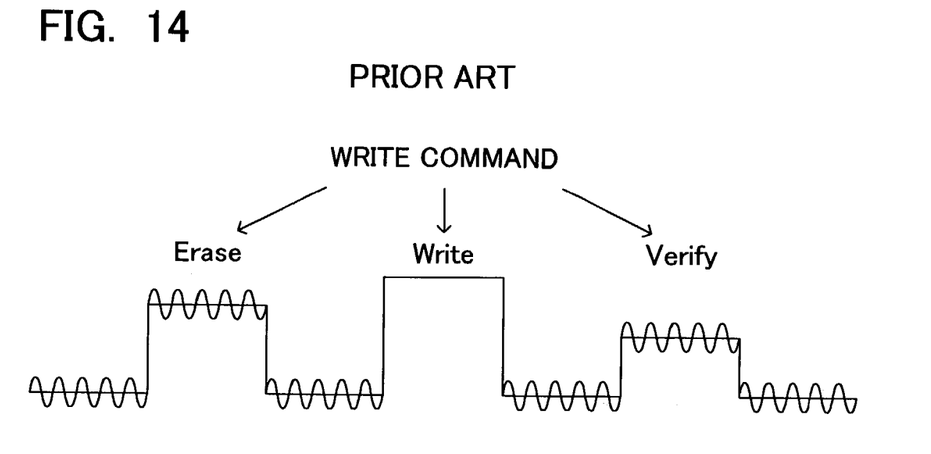
FIG. 14 is a diagram depicting a conventional high frequency superimposing method.

FIG. 13 is a diagram depicting the configuration of a conventional optical storage device, and FIG. 14 is a diagram depicting a conventional high frequency superimposing method. As FIG. 13 shows, the light emitted from the semiconductor laser element (laser diode) 90 transmits through the optical system (beam splitter 91, rise mirror 94, etc.), is focused by the objective lens 92, and is irradiated onto the recording medium (disk) 93.

The reflected light from the recording medium 93 returns through the path in which the light came through, and a part of the light returns to the laser element 90 via the beam splitter 91. It is known that the reflected light is also received by the detector 95 via the beam splitter 91, and the regeneration signal, track error signal and focus error signal are generated. By using this track error signal and focus error signal, track servo and focus servo control are performed so that the optical beam follows up the track of the recording medium, and follows up to the focal point.

When the laser beam returns to the semiconductor laser element 90 in this way, the laser beam makes oscillation inside the semiconductor laser element 90 unstable, and fluctuates the laser output. This may cause changes in the quantity of the return light which returns to the detector 95, making the above mentioned servo control status unstable as well. At worst the track servo and focus servo tend to be OFF.

This unstable status does not always occur, but occurs in a certain status under the influence of the temperature of the laser element and the optical path length of the laser beam, etc. It is possible to decrease the return light to the laser element by adding an element to the optical system, but this addition increases the cost.

So a method called high frequency superimposing method (HFM) is adopted as a method to prevent this fluctuation of the laser beam. This method is not used an only DC laser drive current, but superimposes a high frequency signal 98, which is a several hundred MHz frequency, onto the laser drive current. By this, oscillation in the semiconductor laser element becomes multi-mode, and the influence of the return light to the laser element decreases. As a result, the unstable emission of the laser element is solved and servo is stabilized.

In such a high frequency superimposing method, pulse emission is performed according to the write data during the write operation, and a similar effect can be obtained without superimposing a high frequency, as shown in FIG. 14. Therefore generally a high frequency is superimposed during erase and read of a write command (see Japanese Patent No. 2731237, for example).

To superimpose a high frequency, however, extra current (several tens of mA) is required to oscillate high frequency, which may cause a negative influence, such as heating. So a method of increasing the superimposing amount when necessary, not applying a high superimposing amount constantly, has been proposed (e.g. Japanese Patent Laid-Open No. H5-197994).

This proposal discloses that high frequency is superimposed all the time, but the superimposing amount is increased when focus entry, or the superimposing amount is increased at track off when track control can not maintain, or the superimposing amount is increased at retry of a focusing error. In other words, the high frequency superimposing amount is increased to prevent noise at focus entry, or when track servo off, since the return light amount increases at that time.

Recently such optical disk drives are increasingly used for mobile equipment. Particularly for battery-powered equipment, a decrease of power consumption is an important issue, where power reduction in mA units is requested. For this point of view, high frequency superimposing is not preferable, and should be avoided if possible.

In the recent USB (Universal Serial Bus) interface standard, the power supply amount is controlled to be a predetermined value, and power capacity beyond necessity cannot be received. Operation within the range of the power supply amount is certainly possible, but power exceeding this may be required depending on the operation status, and in such a case the disk drive stops. In other words, there is no extra power supply, and the margin of the power supply must be increased by minimizing the power consumption.

In the above mentioned prior art, the high frequency superimposing amount is decreased during focus servo control and track servo control, but operation may become unstable even if focus servo and track servo control are ON, so the effect of high frequency superimposing is low, and power consumption loss is rather high. If the high frequency superimposing amount is increased during focus servo and track servo control, on the other hand, power consumption cannot be decreased.

Also to control the increase/decrease of the high frequency superimposing amount, the circuit configuration becomes complicated, which is not good in terms of cost.

SUMMARY OF THE INVENTION

With the foregoing in view, it is an object of the present invention to provide an optical storage device and emission control method for implementing both a decrease of power consumption and stabilization by high frequency imposing.

It is another object of the present invention to provide an optical storage device and emission control method for stabilizing servo by high frequency superimposing while decreasing power consumption by controlling the ON/OFF of high frequency superimposing depending on the status of servo.

It is still another object of the present invention to provide an optical storage device and emission control method for decreasing power consumption by superimposing high frequency only when necessary for stabilizing servo.

To achieve these objects, the present invention is an optical storage device for writing and/or reading data to/from a storage medium using a laser beam, comprising a light source for emitting the laser beam onto the storage medium, a servo controller for performing follow-up control of the laser beam on the storage medium according to the reflected light of the storage medium, a light source driver for applying drive current to the light source for the writing and/or reading, a signal generator for generating high frequency signals to be superimposed onto the drive current, and a controller for judging whether the laser emission of the light source is unstable from the servo control status by the servo controller, and for superimposing the high frequency signals onto the drive current when unstable.

Also the present invention is an emission control method for controlling the emission of the laser light source for irradiating light onto a recording medium, comprising a servo controlling step of performing follow-up control of the laser beam on the storage medium according to the reflected light of the storage medium, a step of judging whether the laser emission of the light source is unstable from the servo control status by the servo control, and a step of superimposing high frequency signals onto the drive current supplied to the laser light source when judging unstable.

In the present invention, high frequency superimposing is OFF as a default (initial status or normal status) so that current is low in default status. When the laser emission becomes unstable and servo control tends to be not able to maintain due to a status change, retry of servo frequently occurs. Firmware judges unstable laser emission using such a servo control status, and when servo retry frequently occurs, the high frequency superimposing is turned ON. The high frequency superimposing is turned OFF when it is judged that servo is stable. In this way, current consumption can be controlled in default status.

According to the present invention, it is preferable that the controller judges whether the probably that the servo control can not maintain is high from the servo control status by the servo controller, superimposes the high frequency signals onto the drive current when high, and cancels superimposing of the high frequency signals onto the drive current when low. Therefore the high frequency superimposing can be turned OFF when servo is stable, which improves the power saving effect.

Also according to the present invention, it is preferable that the signal generator comprises oscillation unit for generating the high frequency signals, and a switch for superimposing the generated high frequency signals onto the drive current by controlling of the controller. Also according to the present invention, it is preferable that the high frequency superimposing step comprises a step of generating the high frequency signals and a step of superimposing the generated high frequency signals onto the drive current by operating the switch. Since the high frequency superimposing can be controlled by the ON/OFF of the switch, circuit configuration is simple, which is good in terms of cost.

Also according to the present invention, it is preferable that the controller counts the number of times when the servo control can not maintain, and judges whether the laser emission is unstable according to the count value. Therefore the probability that the servo control can not maintain can be easily judged.

According to the present invention, it is preferable that the servo controller comprises an error detecting unit for detecting the follow-up error of the laser beam from the reflected light, and a servo controlling unit for turning OFF the servo control when the error is a predetermined value or more, and performs follow-up control of the laser beam when the error is not a predetermined value or more.

Also according to the present invention, it is preferable that the servo control is a track servo control for following up the laser beam onto the tracks of the storage medium. Also according to the present invention, it is preferable that the light source driver applies drive current according to one of writing, reading and erasing of the storage medium, and the controller controls the superimposing of the high frequency signal during the erasing.

DESCRIPTION OF THE PREFERRED EMBODIMENTS

Embodiments of the present invention will now be described in the sequence of optical storage device, emission control processing, and other embodiments, but the present invention is not limited to these embodiments.

[Optical Storage Device]

Figure 1:
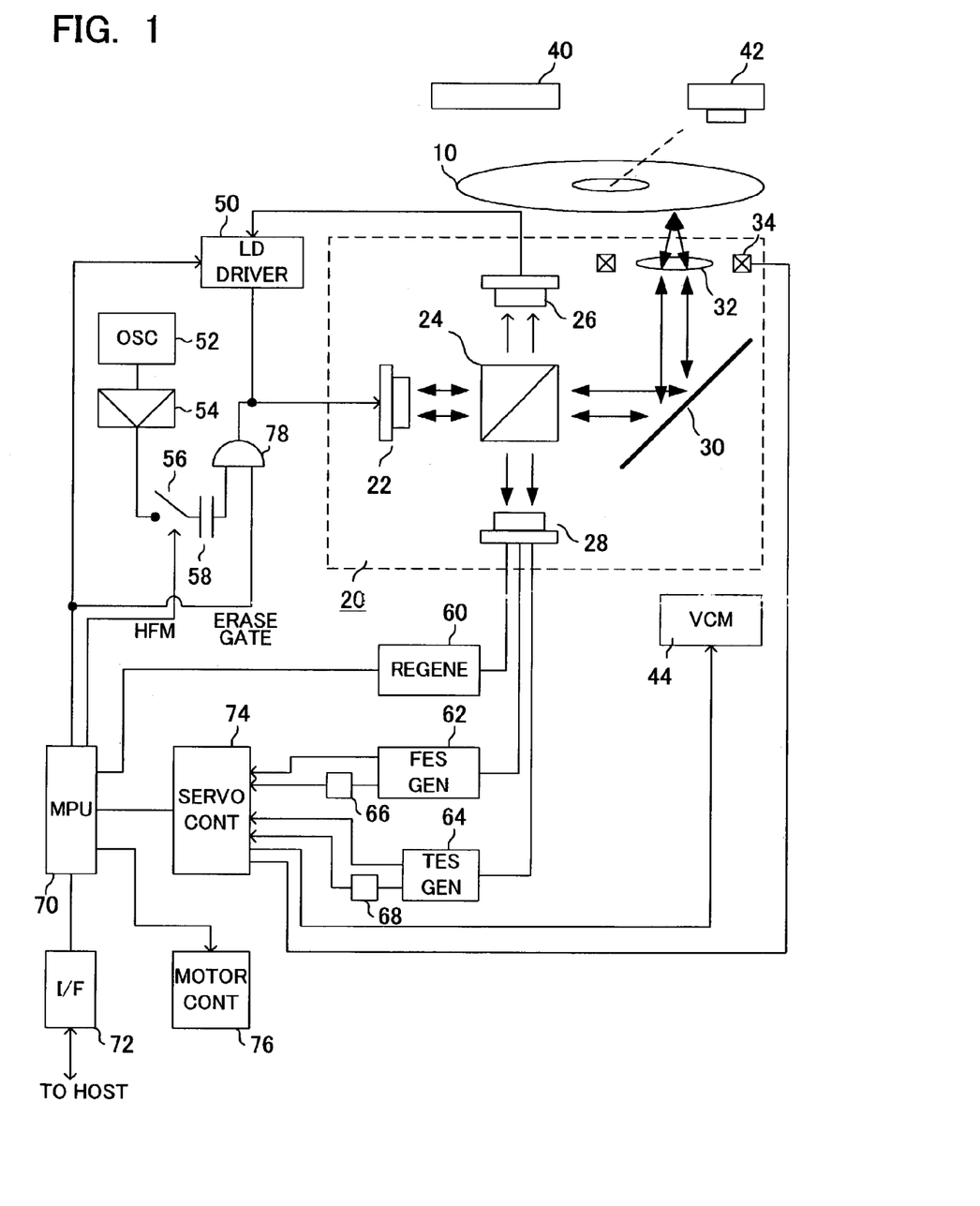
FIG. 1 is a block diagram depicting an optical storage device according to an embodiment of the present invention.
Figure 2:
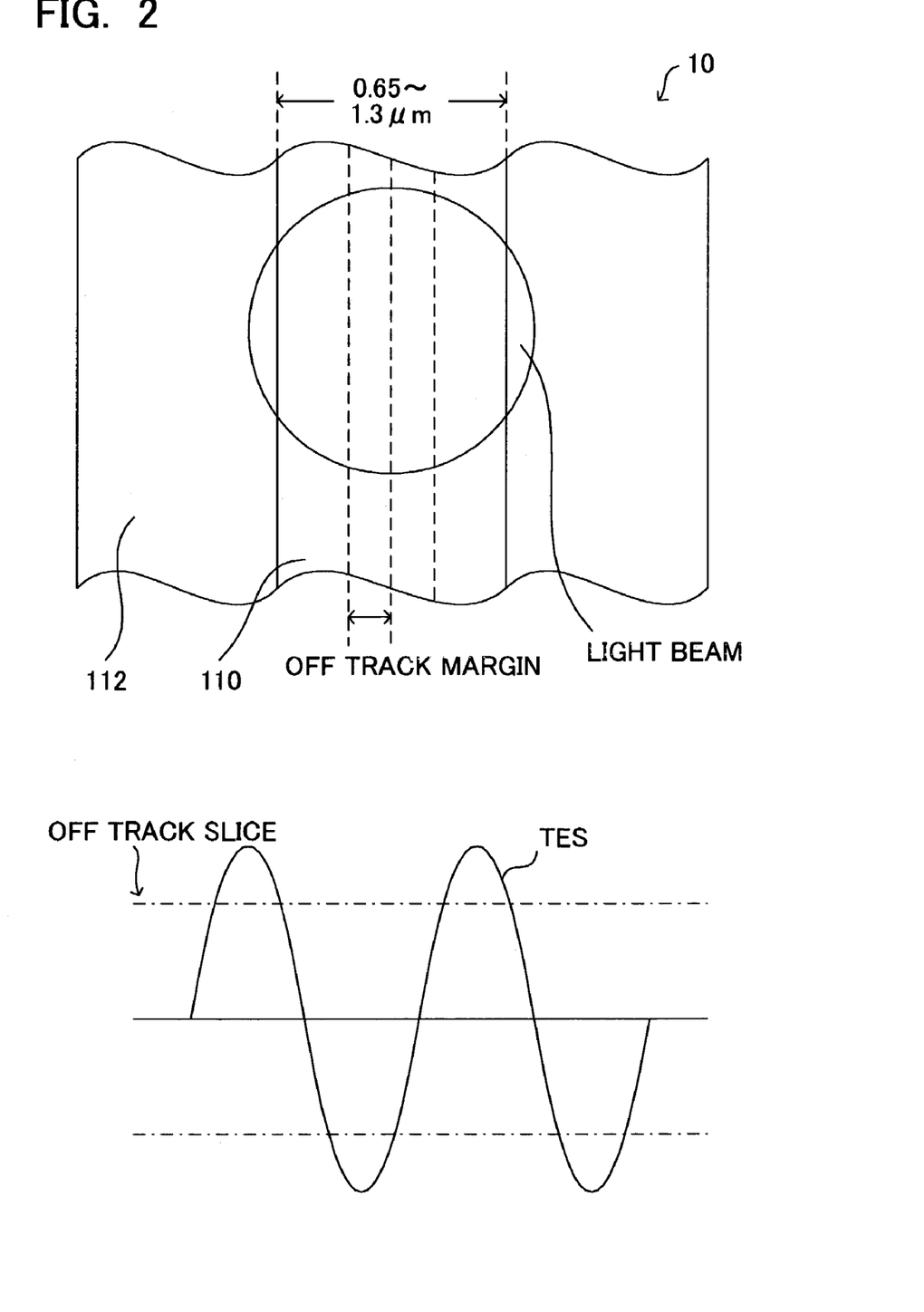
FIG. 2 is a diagram depicting the track servo control in FIG. 1.
Figure 3:
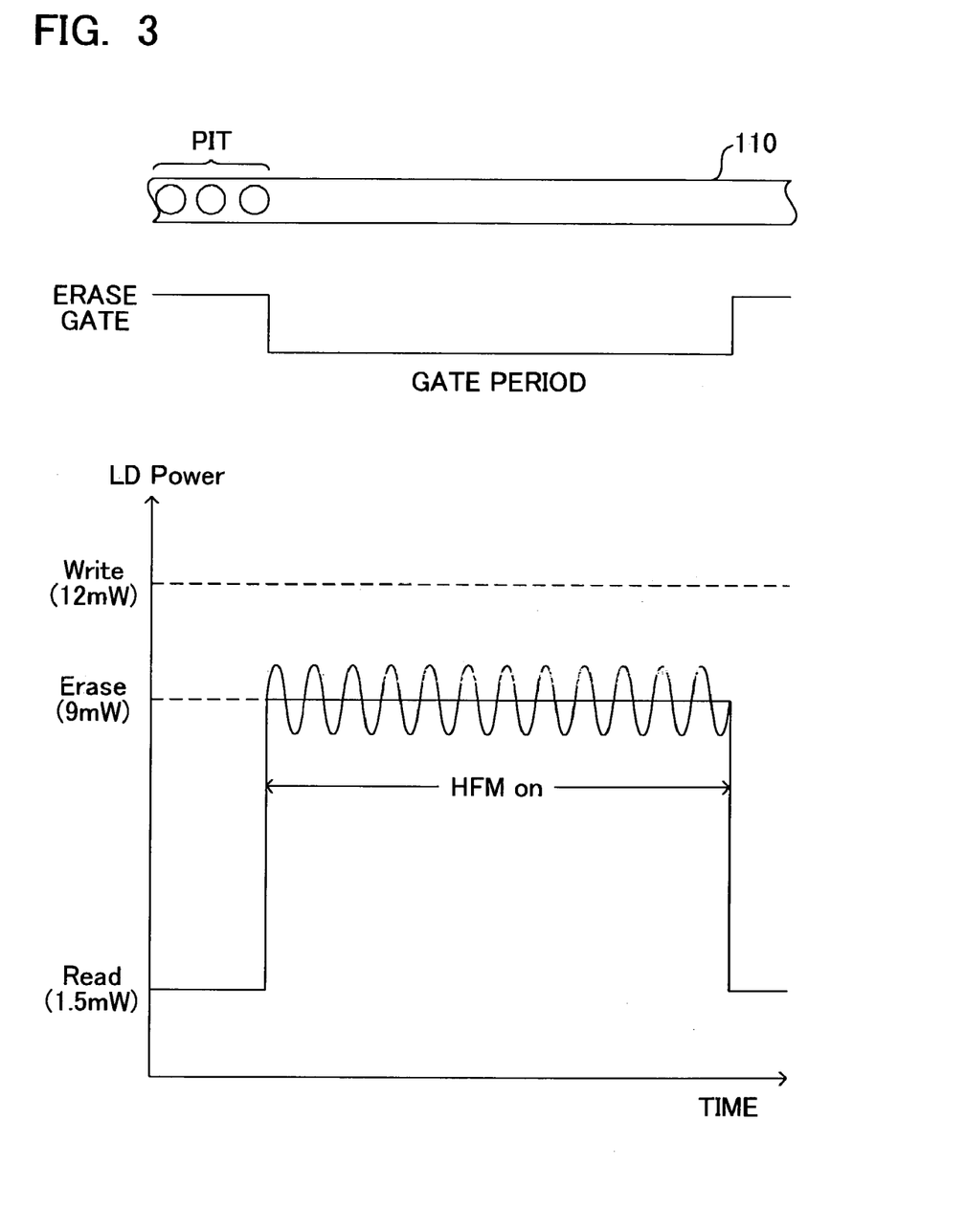
FIG. 3 is a diagram depicting the LD drive current and the high frequency superimposing in FIG. 1.

FIG. 1 is a block diagram depicting the entire optical disk drive according to an embodiment of the present invention, FIG. 2 is a diagram depicting the off track in FIG. 1, and FIG. 3 is a diagram depicting emission control of the laser element in FIG. 1. In FIG. 1, a magneto-optical drive that uses a magneto-optical disk as a recording medium will be described as an example of the optical storage device.

As FIG. 1 shows, the spindle motor 42 rotates the optical information recording medium (MO disk) 10. Normally the MO disk 10 is a removable medium, and is inserted into the slot of the drive, which is not illustrated. The optical pickup 20 is installed facing the magnetic field applying coil 40 so as to sandwich the optical information recording medium 10.

The optical pickup 20 is moved by the track actuator (voice coil motor: VCM) 44 so as to access an arbitrary position in the radius direction of the optical information recording medium 10.

The optical head (optical pickup) 20 will now be described. The diffused light from the laser diode 22 is guided to the optical information recording medium 10 side via the beam splitter 24, becomes collimated light by the collimator lens (not illustrated), is reflected by the rise mirror 30, and is focused to nearly the diffraction limit on the optical information recording medium 10 by the objective lens 32. The optical head 20 may be comprised of a separation type optical system where the objective lens 32 is a movable optical system, and the laser diode 22 and the detector are a fixed optical system.

A part of the light that enters the beam splitter 24 is reflected by the beam splitter 24, and is condensed into the APC (Auto Power Control) detector 26 via the condenser lens, which is not illustrated.

The light reflected by the optical information recording medium 10 is reflected by the mirror 30 via the objective lens 32 again, then becomes converged light by the collimator lens, which is not illustrated, and enters the beam splitter 24 again. A part of the light which entered the beam splitter 24 again returns to the laser diode 22, and the rest of the light is reflected by the beam splitter 24 and is condensed to the reflected light detector 28 via the three beam Wollaston prism and cylindrical surface lens, which are not illustrated.

The reflected light detector 28 is comprised of the four division detector, MO signal detectors which are installed above and below the four division detector, and the detectors for track error detection which are installed to the left and right of the four division detector, since the incident light has three beams.

The regeneration signal obtained from each detector of the reflected light detector 28 will now be described. As FIG. 1 shows, the FES (Focus Error Signal) generation circuit 62 performs focus error detection (FES) based on a known astigmatism method using the photo-electric converted outputs A, B, C and D of the four division photo-detector. That is, $FES=(A+B)-(C+D)/(A+B+C+D)$. At the same time, the TES generation circuit 64 based on the push-pull method performs track error detection (TES) according to the following formula using the output E and F of the track detection detector.

$$TES=(E-F)/(E+F)$$

The focus error signal (FES) and the track error signal (TES) determined by these calculations are input to the servo controller 74 as the position error signals in the focus direction and the track direction. The off focus detection circuit 66 slices the amplitude of the focus error signal FES by a predetermined off focus slice, and outputs the off focus signal. The off track detection circuit 68 slices the amplitude of the track error signal TES by a predetermined off track slice, and outputs the off track signal.

The record information detection of the MO disk 10 is as follows. The polarization characteristic of the reflected light, which changes depending on the direction of magnetization of the photo-magnetic recording layer on the optical information recording medium 10, is converted into light intensity. In other words, the reflected light from the beam splitter 24 is separated into two beams, where the polarization directions are perpendicular to each other in the polarization direction, by the three beam Wollaston prism, which is not illustrated. The two beams enter the two division photo-detectors of the reflected light detector 28 via the cylindrical surface lens, and are photo-electric converted respectively.

Two electric signals G and H, which were photoelectric converted by the two division photo-detector, are subtracted by the read regeneration circuit 60 to generate read (MO) signals (RAM=G−H), and are output to the main controller (MPU) 70.

The reflected light of the semiconductor laser diode 22, which entered the photo-detector for APC 26, is photoelectric converted and is input to the LD drive 50. The LD drive 50 outputs the DC drive current with a value according to each mode (read, write, erase) instructed by the main controller 70, and performs negative feedback control using the detection output of the above mentioned photo-detector 26.

The servo controller 74 is input the focus error signal (FES) from the FES generation circuit 62 and the track error signal (TES) from the TES generation circuit 64, and performs a known focus servo control, and drives the focus actuator 34 that drives the objective lens 32 of the optical head 20 in the focus direction. In the same way, the servo controller 74 performs track servo control according to the track error signal (TES), and drives the track actuator (VCM) 44.

The motor controller 76 controls the rotation of the spindle motor 42. The interface circuit 72 controls the interface between the main controller 70 and the external host.

The main controller 70 outputs the command (read, write, erase) signal and write data to the LD driver 50 according to each mode. The LD driver 50 performs negative feedback control for the emission power of the semiconductor laser diode 22, and outputs the read current during regeneration according to the read command signal. In the same way, the LD driver 50 performs negative feedback control for the emission power of the semiconductor laser diode 22, and outputs the erase current according to the erase command. Also at photo-magnetic recording using the light modulation recording system, the main controller 70 sends the input data to the LD driver 50, and performs light modulation driving of the semiconductor laser diode 22. At this time, in the main controller 70, the recording instruction signal is sent to the LD driver 50, and the LD driver 50 performs negative feedback control of emission of the semiconductor laser diode 22, so as to be the laser power optimum for recording.

The high frequency superimposing circuit is comprised of an oscillator 52 for oscillating several hundred MHz high frequency signals, an amplifier 54 for amplifying the high frequency signals of the oscillator 52, a switch 56, a capacitor for coupling 58, and an AND gate 78. This switch 56 is turned ON/OFF by the HFM signal of the main controller 70, and the AND gate 78 is opened by the erase gate signal of the main controller 70.

The main controller 70 judges whether the focus servo and track servo control can not maintain by the off focus signal and off track signal, and controls the HFM signal.

According to the above description of the example, the focus error signal is detected by the astigmatism method, and the track error signal is detected by the push-pull method, and the MO signal is detected from the differential detection signal of the polarization component, but the above mentioned optical system is used merely for an embodiment of the present invention, and the knife edge method or spot size position detection method may be used for the focusing error detection method without problems. Also for the tracking error detection method, the three beam method or phase difference method may be used without problems.

The servo controller 74 drives the focus actuator 34 according to the detected focus error signal FES, and controls focusing of the optical beam. In the same way, the servo controller 74 drives the track actuator 44 according to the detected track error signal TES, and performs follow-up control of the optical beam by seeking and tracking same.

FIG. 2 is a diagram depicting the relationship between the magneto-optical disk 10 and the track error, and shows the track follow-up operation of the optical beam of the magneto-optical disk 10 having tracks (lands) 110 and grooves 112. In this example, the off track slice for the track error signal TES is set according to the off track margin, and the off track detection circuit 68 outputs the off track signal when the amplitude of the track error signal TES exceeds the off track slice.

The main controller 70 turns the high frequency superimposing of the laser diode emission ON/OFF using the HFM signal. Conventionally high frequency superimposing is set to ON from the beginning to prevent an unstable emission status. However if the high frequency superimposing is ON, extra several tens mA of power consumption is required. Unstable status of laser diode emission due to the return light does not always occur, but does occasionally depending on the reflection status of the recording medium 10 and the light irradiation position.

This unstable emission status leads to instability of servo control, and servo control tends to be unable to maintain. Therefore the main controller 70 sets the high frequency superimposing to OFF as a default (normal status), and turns the high frequency superimposing ON when servo OFF occurs frequently.

The operation will be described with reference to FIG. 3. In the magneto-optical disk 10, the emission power is different among the three operations: write, erase and read. For example, as FIG. 3 shows, write power is at the maximum, that is 12 mW, erase power is intermediate, 9 mW, and read power is at the minimum, that is 1.5 mW. Here an example of the ON/OFF control of the high frequency superimposing at data erasing is described. In other words, high frequency superimposing is turned ON during read because at this time emission power is low and power consumption is small. During writing, on the other hand, high frequency superimposing is turned OFF since the laser diode is driven at a several tens MHz frequency by the write data. During erasing, emission power is high and the drive signal is not modulated, so high frequency superimposing is controlled to be ON or OFF.

The main controller 70 has a counter for ON/OFF control, which integrates the number of times when servo control is unable to maintain (number of times of off focus/off track) during erasing. The value of this counter is increased at the time that servo control is unable to maintain during erasing, and is decreased at the time that servo control maintains.

When this counter value exceeds a certain threshold value, it is judged that emission status is unstable, and servo control tends to be unable to maintain, and applying high frequency superimposing is started. When this counter value becomes another threshold value or less, and it is judged that servo is stable and applying high frequency superimposing is stopped. In other words, if servo OFF occurs only once, the cause of the instability of emission status is unknown, and another cause, such as shock, is possible. So it is judged that the instability of emission status is the cause when servo OFF occurs a plurality of times, and high frequency superimposing is turned ON at this point.

In the case of the above mentioned prior art (see Japanese Patent Laid-Open No. H5-197994, for example), the amount of superimposing is increased at focus entry, the amount of superimposing is increased at track off, and the amount of superimposing is increased at retry of focus entry. Since the amount is changed, unlike the ON/OFF control of superimposing of the present invention, circuits become complicated. Emission may become unstable even when focus and track servo control maintain, so decreasing the superimposing amount when servo control maintains does not increase the effect of high frequency superimposing.

In the case of the present invention, on the other hand, superimposing itself is turned ON/OFF not changing the superimposing amount, so circuits are simple and the power saving effect is good. Also the superimposing is turned ON by judging the time when emission status is unstable, so the effect of high frequency superimposing is high. If emission status is stable, superimposing is turned OFF, so power consumption is low.

[Emission Control Processing]

Figure 4:
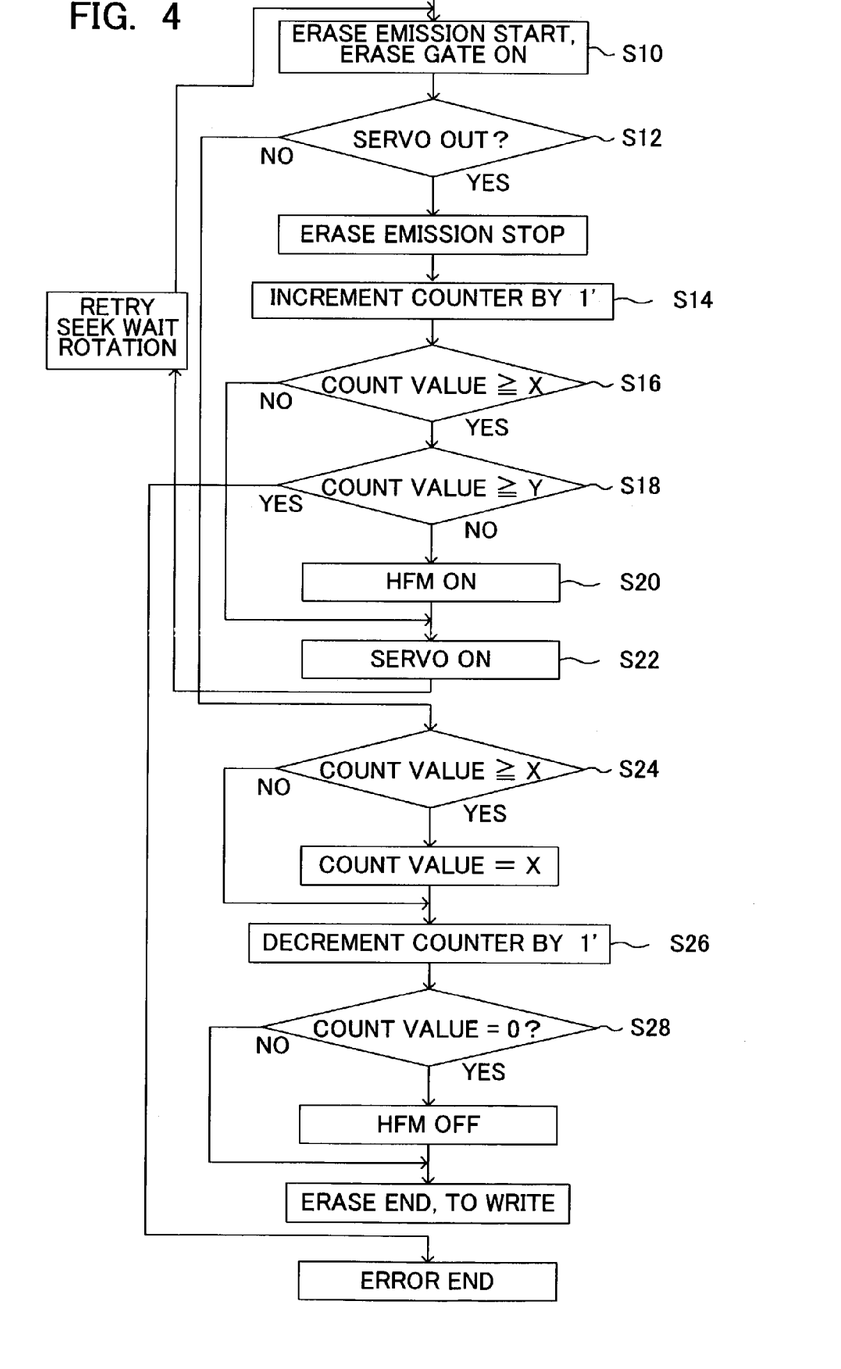
FIG. 4 is a flow chart depicting emission control processing during the erasing in FIG. 1.
Figure 5:
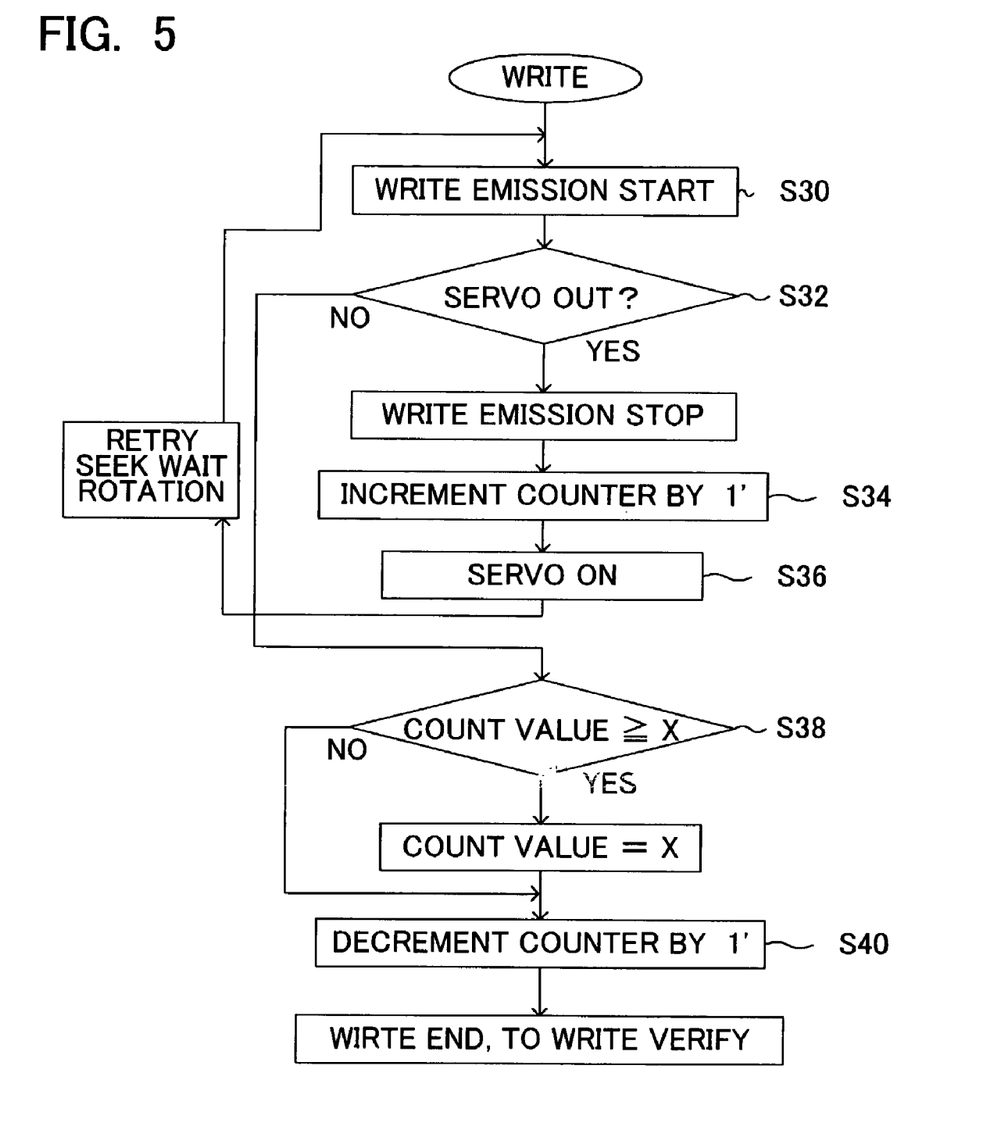
FIG. 5 is a flow chart depicting emission control processing during the writing in FIG. 1.
Figure 6:
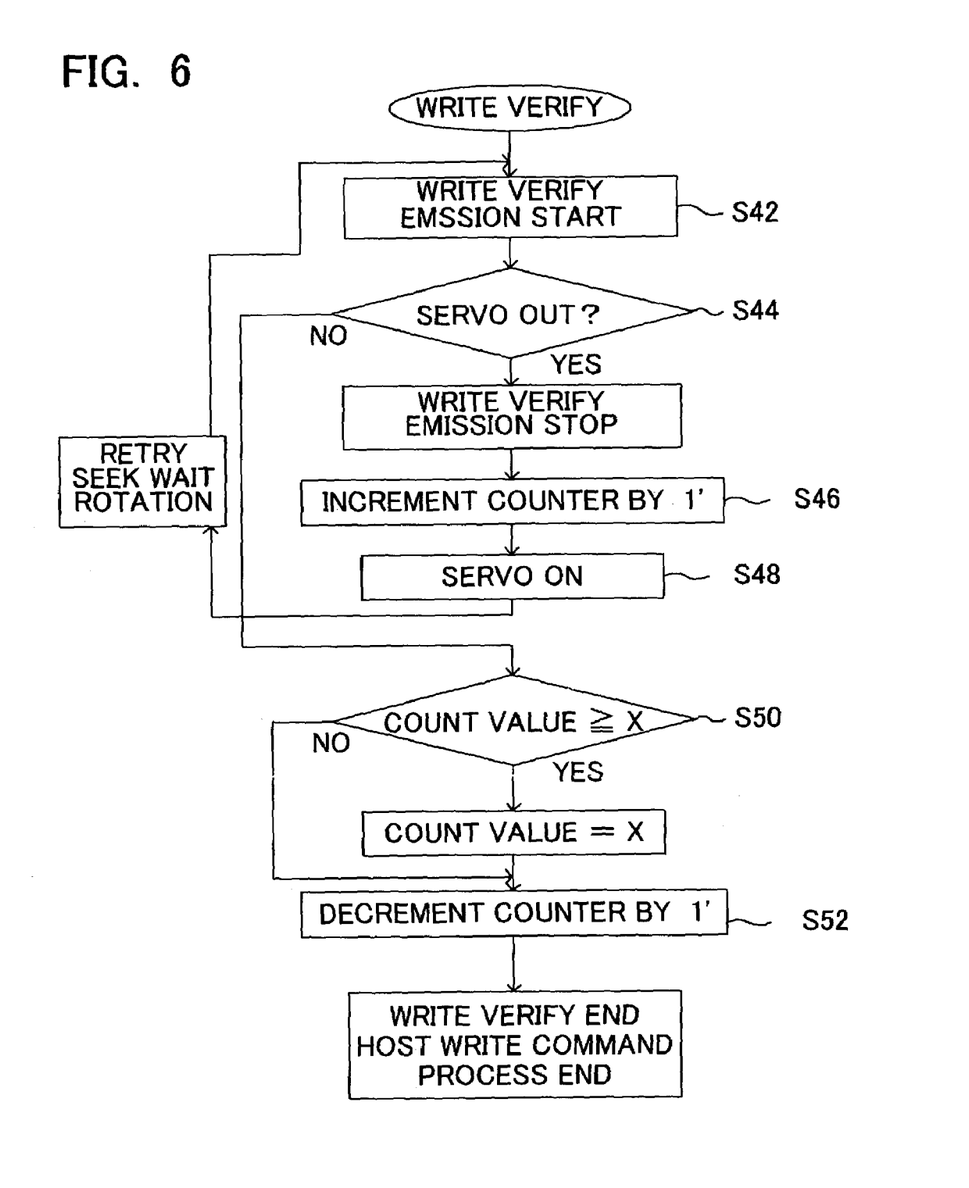
FIG. 6 is a flow chart depicting emission control processing during the verifying in FIG. 1.
Figure 7:
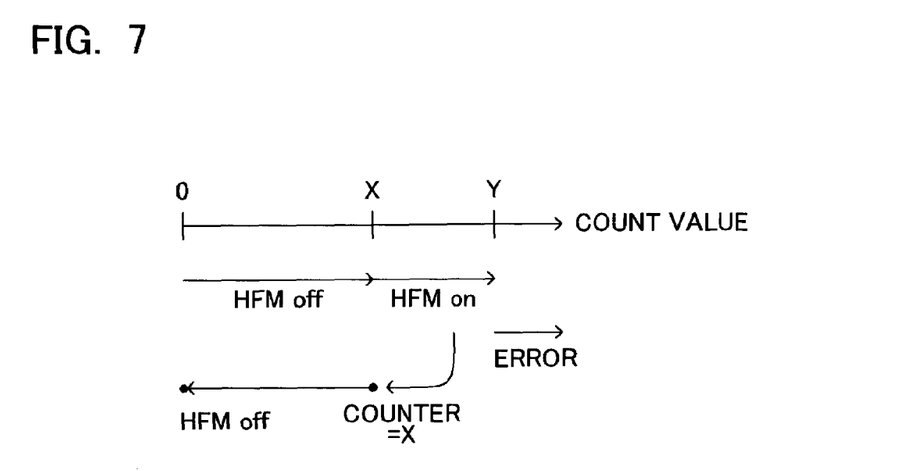
FIG. 7 is a diagram depicting the emission control operation in FIG. 4.
Figure 8:
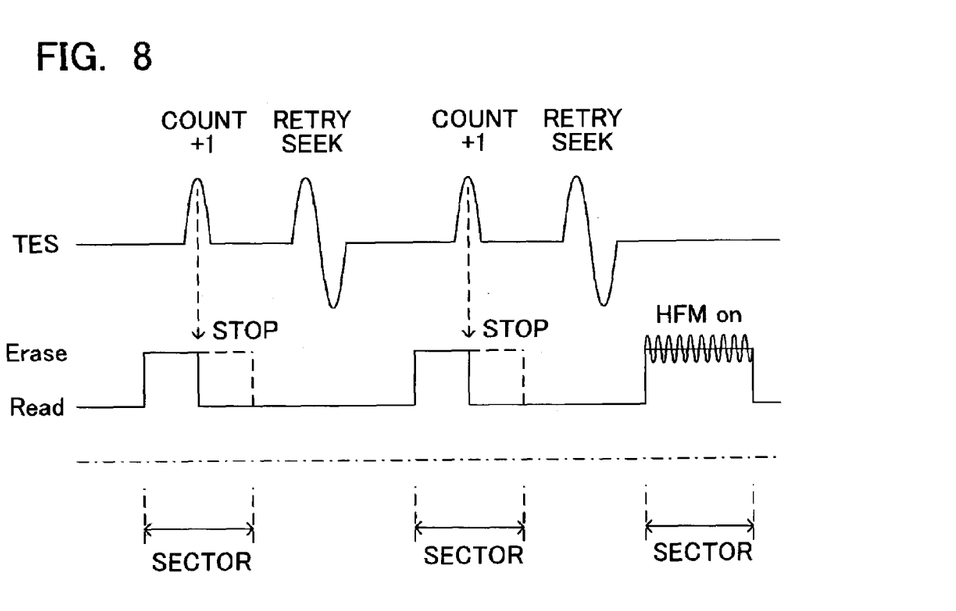
FIG. 8 is a diagram depicting emission control processing in FIG. 4.

FIG. 4 to FIG. 6 are flow charts depicting emission control processing according to an embodiment of the present invention, and FIG. 7 and FIG. 8 are diagrams depicting operations thereof. The processing in FIG. 4 to FIG. 6 is executed by the main controller (e.g. MPU, ODC, DSP) 70. Here the optical disk controller (ODC) of the main controller executes the processing. In the following example, the main controller 70 receives a write command from the host, internally executes three operations, erase, write and write verify, and executes high frequency superimposing control during erasing.

(S10) Erase emission is started in servo ON status. In other words, erase emission current (DC) is supplied from the LD driver 50 to the semiconductor laser 22. The erase gate signal is turned ON and the gate 78 is opened. Before this step, the counter is cleared and the HFM signal is turned OFF in initialization processing when the power of the device is turned ON and when loading the disk medium.

(S12) The MPU 70 monitors the off focus signal and off track signal of the detection circuits 66 and 68, and judges whether servo is out (that is, whether off focus signal or off track signal is ON or not). Further when the off focus signal or the off track signal is ON, the servo controller 74 turns the focus or track servo loop OFF, and the LD driver 50 stops erase emission. If servo is not out, processing advances to step S24.

(S14) If it is judged that servo is out (that is, the servo control can not maintain), the counter is incremented "1".

(S16) It is judged whether the value of the counter is threshold value X (X is a $\geq 2$ integer, such as 5) of HFM ON. If the counter value is not "X" or more, processing advances to step S22.

(S18) If the counter value is "X" or more, it is judged whether the counter value is the threshold value Y of error (Y is a >X integer, such as 10) or more. If the counter value is "Y" or more, the error cannot be saved even if high frequency is superimposed, so processing ends with an error.

(S20) If the counter value is not "Y" or more, the HFM signal is turned ON. By this, the switch 56 in FIG. 1 turns ON, and a several hundred MHz high frequency current is superimposed on the erase current, and the semiconductor laser 22 is driven (see FIG. 3).

(S22) Servo, which has been OFF, is turned ON. The servo controller 74 turns the focus or track servo loop ON to execute focus servo control or track servo control. And the servo controller 74 executes seek for retry and waits for disk rotation up to this erase target sector, and processing returns to step S10.

(S24) If it is judged that servo is not out in step S12, it is judged whether the counter value is threshold value X of HFM ON or more. If the counter value is not "X" or more, processing advances to step S26. If the counter value is "X"

or more, the servo does not easily become OFF, so the counter value is set to "1".

(S26) The counter is decremented "1".

(S28) It is judged whether the counter is "0". If the counter is not "0", this erase command processing ends and processing moves to the write processing in FIG. 5. If the counter is "0", the HFM signal is turned OFF. By this, the switch 56 in FIG. 1 turns OFF, and the superimposing of a several hundred MHz high frequency current on the erase current stops (see FIG. 3). And the counter value is set to "0", the erase command processing ends, and processing moves to the write processing in FIG. 5. If the counter value is smaller than "0", the counter value is reset to "0".

(S30) In the write processing in FIG. 5, write emission starts in servo ON status. In other words, write emission current (DC) is supplied to the semiconductor laser 22 from the LD driver 50.

(S32) The MPU 70 monitors the off focus signal and off track signal of the detection circuits 66 and 68, and judges whether servo is out (that is, whether the off focus signal or off track signal is ON or not). When the off focus signal or off track signal turns ON, the servo controller 74 turns the focus or track servo loop OFF, and the LD driver 50 stops the write emission. When the servo is not out, processing advances to step S38.

(S34) If it is judged that servo is out, the counter is incremented "1".

(S36) The servo, which has been OFF, is turned ON. In other words, the servo controller 74 turns the focus or track servo loop ON, and executes focus servo control or track servo control. And the servo controller 74 executes seek for retry, waits disk rotation up to the write target sector, and processing returns to step S30.

(S38) If it is judged that servo is not out in step S32, it is judged whether the counter value is the threshold value X of HFM ON or more. If the counter value is not "X" or more, processing advances to step S40. If the counter value is "X" or more, the servo does not become easily out, so the counter value is set to "X".

(S40) The counter is decremented "1". And it is judged whether the write operation in that sector has ended, and if ended, write operation ends and processing moves to the write verify processing in FIG. 6.

(S42) In the write verify processing in FIG. 6, read emission starts in servo ON status. In other words, read emission current (DC) is supplied to the semiconductor laser 22 from the LD driver 50.

(S44) The MPU 70 monitors the off focus signal and off track signal of the detection circuits 66 and 68, and judges whether servo is out (that is, whether the off focus signal or off track signal is ON or not). When the off focus signal or off track signal turns ON, the servo controller 74 turns the focus or track servo loop OFF, and the LD driver 50 stops the read emission. When the servo is not out, processing advances to step 50.

(S46). If it is judged that servo is out, the counter is incremented "1".

(S48) The servo, which has been off, is turned ON. In other words, the servo controller 74 turns the focus or track servo loop ON, and executes focus servo control or track servo control. And the servo controller 74 executes seek for retry, waits disk rotation up to the write verify target sector, and processing returns to step S42.

(S50) If it is judged that servo is not out in step S44, it is judged whether the counter value is threshold value X of HFM ON or more. If the counter value is not "X" or more, processing advances to step S52. If the counter value is "X" or more, the servo does not become easily out, so the counter value is set to "X".

(S52) The counter is decremented "1". And it is judged whether the write verify operation in that sector has ended, and if ended, write verify processing ends and a series of processings for the write command from the host ends.

FIG. 7 shows the relationship between the count value and the HFM signal. A counter that integrates the number of times when servo became out (number of times off focus/off track) during erasing is installed. The value of this counter is increased if servo becomes out during erasing. If servo did not become out, the value of this counter is decreased. This counter is also increased/decreased during write and write verify according to servo becoming out.

When this counter value exceeds a certain threshold value X or more, it is judged that emission status is unstable and servo tends to be out, and applying high frequency superimposing is started. When this counter value becomes another threshold value or less ("0" in this case), it is judged that servo is stable, and applying high frequency superimposing is stopped.

In other words, if servo OFF occurs only once, the cause of instability of emission status is unknown, and another cause, such as shock, is possible. So it is judged that the instability of emission status is the cause when servo OFF occurs a plurality of times, and high frequency superimposing is turned ON at this point.

As FIG. 8 shows, servo OFF status is monitored with setting high frequency superimposing to OFF as a default (normal status), and if servo becomes OFF, erase emission is stopped and retry seek is executed. It is judged that emission status is unstable when servo OFF occurs frequently and the probability that servo becomes OFF increases, and high frequency superimposing is turned ON. And when it is judged that emission status is stable again, high frequency superimposing is turned OFF. Therefore power consumption can be controlled, and emission noise due to high frequency superimposing can be effectively decreased since high frequency superimposing is turned ON only when necessary.

[Other Embodiments]

Figure 9:
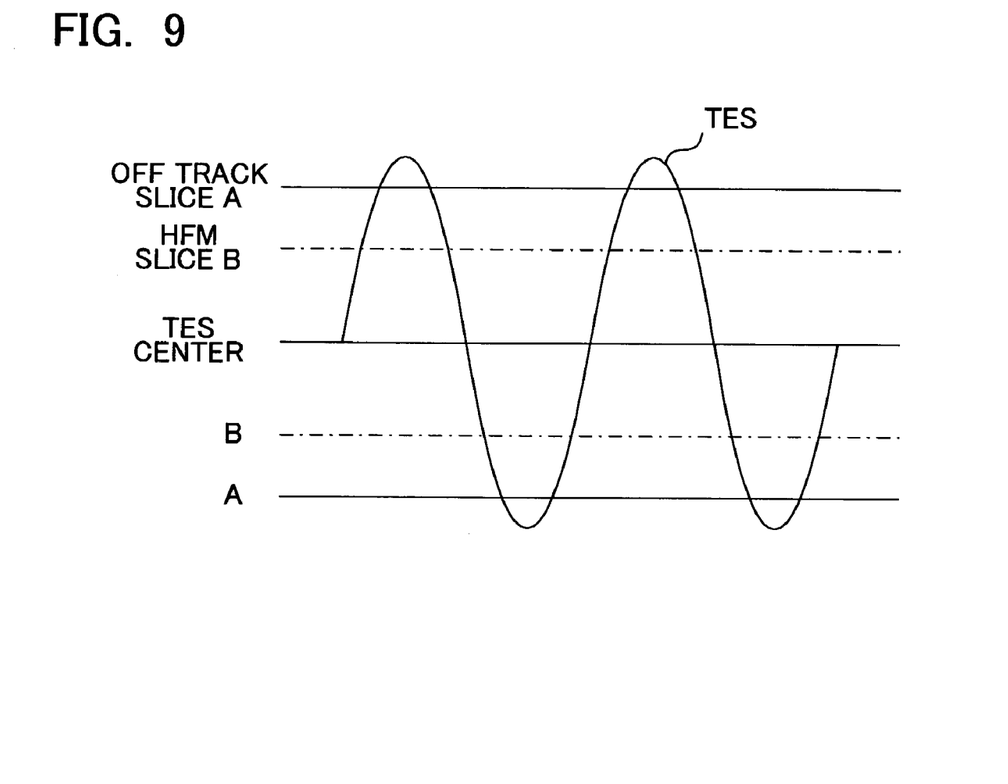
FIG. 9 is a diagram depicting a second embodiment of the present invention.
Figure 10:
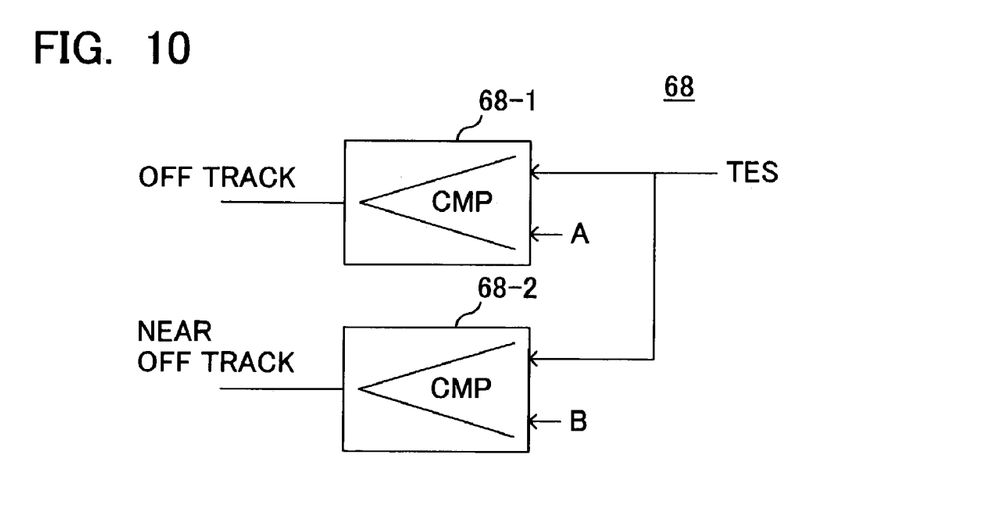
FIG. 10 is a block diagram depicting the signal detecting section for the second embodiment in FIG. 9.
Figure 11:
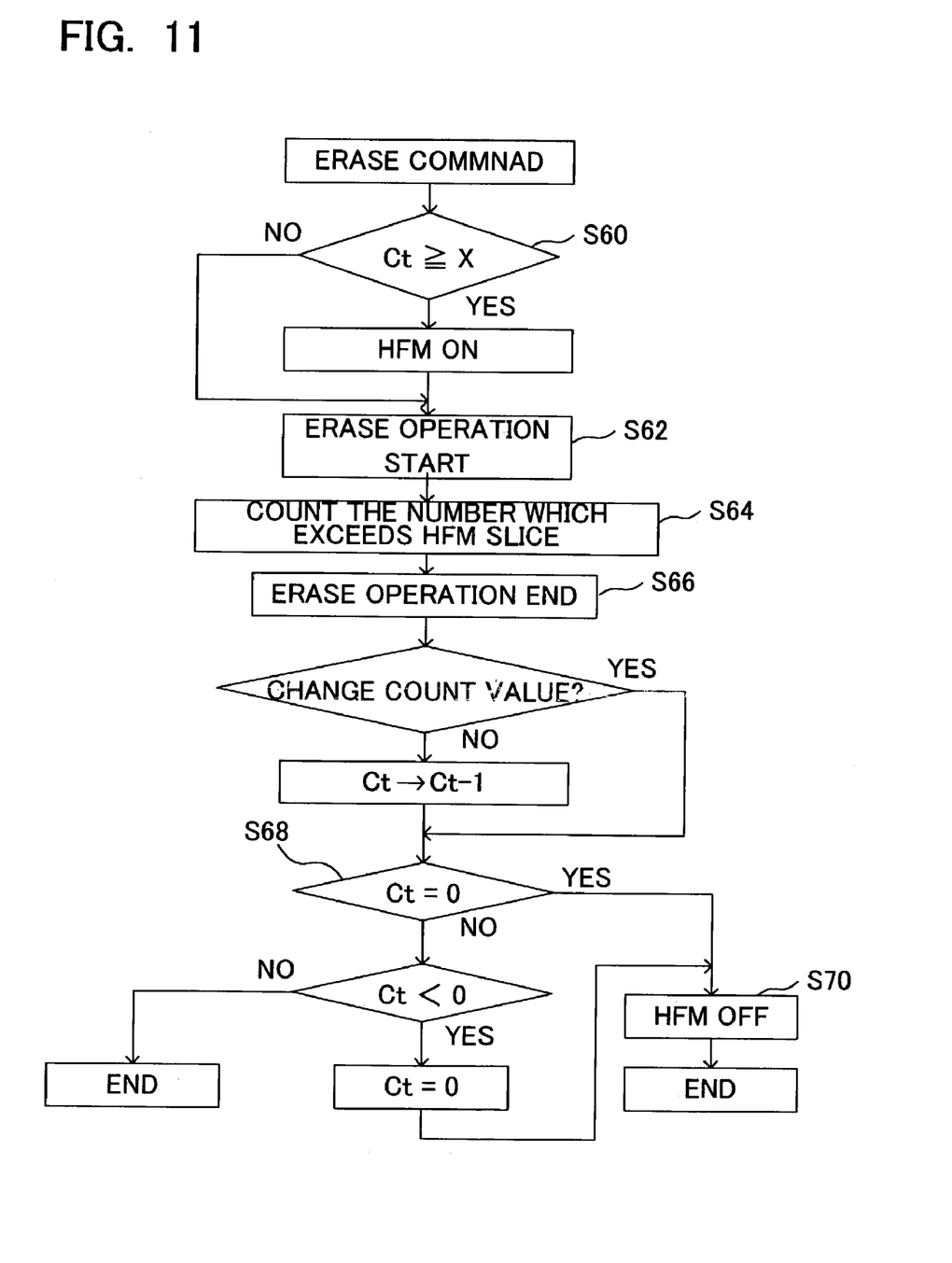
FIG. 11 is a flow chart depicting emission control processing according to the second embodiment in FIG. 9.

FIG. 9 is a diagram depicting the second embodiment of the present invention, FIG. 10 is a block diagram depicting the second embodiment, and FIG. 11 is a flow chart depicting emission control processing of the second embodiment of the present invention.

As FIG. 9 shows, HFM slice B, which has a value smaller than the off track slice A of the track error signal TES, is provided, and it is judged that off track possibly occurred when the track error signal TES exceed the HFM slice B, and a near off track signal is generated.

This is used instead of the above mentioned off track signal, and processing in FIG. 11 is executed. This method makes preventive high frequency superimposing possible, prevents off track, and improves track follow-up performance. However, the power saving effect drops more than the first embodiment.

As FIG. 10 shows, a second comparator 68-2, which compares the HFM slice B and TES, and generates a near off track signal, is installed in the off track detection circuit 68, in addition to the comparator 68-1, which compares the off track slice A and TES, and generates an off track signal.

By this, the main controller 70, that is the optical disk controller in particular, executes the processing in FIG. 11 using the near off track signal. In the same way, a near off focus signal may be generated for the focus error signal (FES) as well.

Emission control processing using the near off track signal will now be described with reference to FIG. 11.

(S60) When the erase command is received, it is judged that the counter value Ct of the counter is "X" or more. X is the threshold value to judge HFM ON. If the counter value Ct is "X" or more, the HFM signal is turned ON and a high frequency signal is generated.

(S62) The erase operation is started. In other words, the erase gate signal is turned ON, and erase current is output from the LD driver 50 to drive the laser diode 22.

(S64) During this erase operation, the near off track signals in FIG. 9 and FIG. 10 are counted by the counter. The count value of this counter is of course Ct.

(S66) The erase operation is ended. It is judged whether the count value of the counter has changed before erase start and after erase end. If there is no change, the near off track signal was not detected during the erase operation, so count value Ct is incremented "1".

(S68) Then it is judged whether the count value Ct is zero. If the count value is not zero, it is judged whether the count value is negative. If the count value is not negative, processing ends. If the count value is negative, the count value is set to "0", and processing ends.

(S70) If the count value is zero, the HFM signal is turned OFF, and processing ends.

In this way, preventive high frequency superimposing is possible, off track can be prevented, and track follow-up performance improves.

Figure 12:
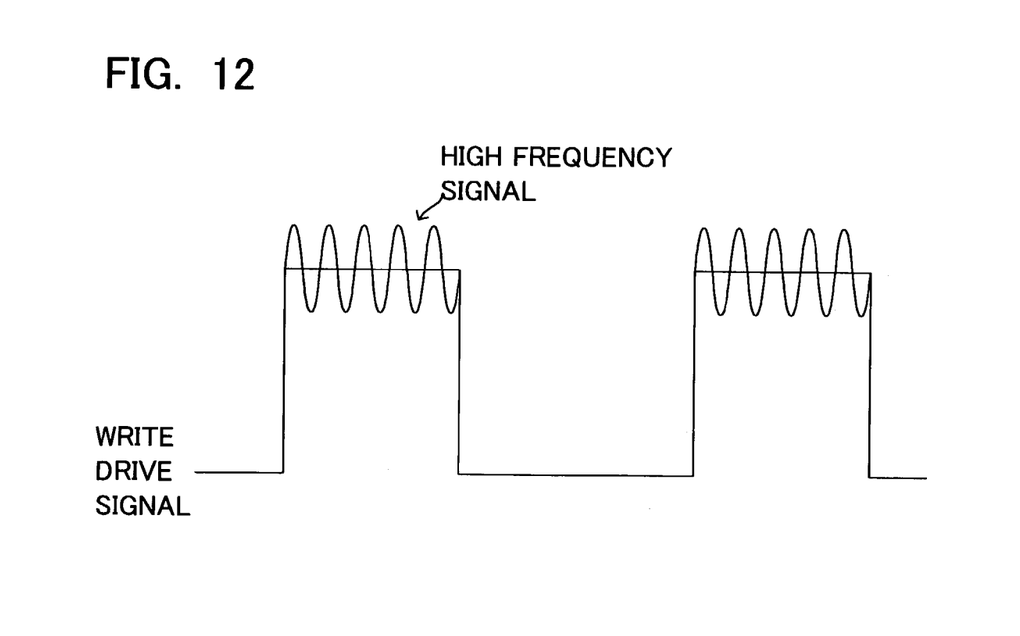
FIG. 12 is a diagram depicting the third embodiment of the present invention.

FIG. 12 is a diagram depicting the third embodiment of the present invention. The example in FIG. 12 shows the case when a high frequency signal is superimposed onto the write drive signal. In this way, the high frequency signal can be superimposed during write as well as during erase.

The magneto-optical disk drive for recording, regenerating and erasing data was used for descriptions, but the present invention can be applied to other optical disk drives (e.g. DVD-RW, CD-RW) which records, regenerates and erases data. In this case, it is also possible that the condition to turn the HFM signal ON during write is judged, and HFM superimposing can be executed at the subsequent write verify (verify read). Also HFM superimposing can be started from erase processing for the next host command.

Servo off may be counted only during erase or during erase and verify. The present invention can be applied to an overwrite type magneto-optical disk drive and optical disk drive which performs recording and regeneration, and in this case, it is preferable that high frequency superimposing is executed during write. High frequency superimposing may also be executed during read and write.

The present invention can be applied to a magnetic field modulation writing type magneto-optical disk drive, and in this case, it is preferable that high frequency superimposing is executed during write and erase. The servo OFF was described for both off focus and off track, but servo OFF may be detected targeting only off track. The recording medium is not limited to a disk shape but may be a card shape.

Unstable status of the laser beam may be detected or high frequency is superimposed in the same way for a regeneration only device. Even if the conditions to apply high frequency superimposing are met, high frequency superimposing may be applied only during the period when the gate signal for creating timing to execute emission power control for read, write or erase is effective. By this, power consumption for the period when the gate signal is invalid (seek, rotation waiting) can be saved.

The present invention was described using the embodiments, but various modifications are possible within the scope of the essential character of the present invention, and these shall not be excluded from the technical scope of the present invention.

In this way, high frequency superimposing consumes extra power, but if high frequency superimposing is not applied, laser emission may become unstable due to the influence of the return light to the laser light source, and in such a case servo becomes unstable. In order to decrease the influence of the return light and to stabilize servo, the optical system must be corrected, which increases cost.

In the present invention, high frequency superimposing is set to OFF as a default to save power consumption, and high frequency superimposing is turned ON only when it is judged that servo is unstable, and high frequency superimposing is turned OFF when it is judged that servo is stable, so power consumption can be controlled. In other words, if servo is unstable, power consumption cannot help increasing, but as a default, low power consumption status is set to improve the power saving effect. Particularly in the case of a drive which drives via an interface with a low power supply amount, the present invention is effective to increase the margin of power of the power supply.

What is claimed is:

1. An optical storage device for writing and/or reading data to/from a storage medium using a laser beam, comprising:
    a light source for emitting the laser beam onto said storage medium;
    a servo controller for performing follow-up control of said laser beam on said storage medium according to the reflected light of said storage medium;
    a light source driver for applying drive current to said light source for said writing and/or reading;
    a signal generator for generating high frequency signals to be superimposed onto said drive current; and
    a controller for judging whether the laser emission of said light source is unstable from the servo control status by said servo controller, and superimposing said high frequency signals onto said drive current when judging that the laser emission is unstable, and
    wherein the controller cancels superimposing of said high frequency signals onto said drive current when judging that the laser emission is stable from the servo control status by the servo controller.

2. The optical storage device according to claim 1, wherein said controller judges whether the probability that said servo control becomes OFF is high from the servo control status by said servo controller, superimposes said high frequency signals onto said drive current when judging high, and cancels superimposing of said high frequency signals onto said drive current when judging low.

3. The optical storage device according to claim 1, wherein said signal generator comprises:
    oscillation means for generating said high frequency signals; and
    a switch for superimposing said generated high frequency signals onto said drive current by controlling of said controller.

4. The optical storage device according to claim 1, wherein said controller counts the number of times when said servo control became OFF, and judges whether said laser emission is unstable according to said count value.

5. The optical storage device according to claim 1, wherein said servo controller comprises:
   an error detecting unit for detecting the follow-up error of said laser beam from said reflected light; and
   a servo controlling unit for turning said servo control OFF when said error is a predetermined value or more, and for performing follow-up control of said laser beam when said error is not a predetermined value or more.

6. The optical storage device according to claim 1, wherein said servo control is a track servo control for following up said laser beam on the tracks of said storage medium.

7. The optical storage device according to claim 1, wherein said light source driver applies drive current according to one of the operations of writing, reading and erasing data in/from said storage medium,
   and said controller controls superimposing of said high frequency signal during said erasing.

8. An emission control method of controlling emission of the laser light source for irradiating light onto a storage medium, comprising:
   a servo controlling step of performing follow-up control of said laser beam on said storage medium according to the reflected light of said storage medium;
   a step of judging whether emission of said laser light source is unstable from the servo control status by said servo control;
   a step of superimposing high frequency signals onto the drive current supplied to said laser light source when judging that the laser emission is unstable; and
   a step of canceling said superimposing of said high frequency signals onto said drive current when judging that the laser emission is stable from the servo control status by the servo control.

9. The emission control method according to claim 8, wherein said judgment step comprises a step of judging whether the probability that said servo control becomes OFF is high from the servo control status by said servo control, and said step of superimposing comprises a step of superimposing high frequency signals onto said drive current when said probability is high, and canceling the superimposing of high frequency signals onto said drive current when said probability is low.

10. The emission control method according to claim 8, wherein said step of superimposing high frequency signals comprises:
   a step of generating high frequency signals; and
   a step of superimposing said generated high frequency signals onto said drive current by operating a switch.

11. The emission control method according to claim 8, wherein said judgment step comprises:
   a step of counting the number of times when said servo control became OFF; and
   a step of judging whether said laser emission is unstable according to said count value.

12. The emission control method according to claim 8, wherein said servo controlling step comprises:
   an error detecting step of detecting the follow-up error of said laser beam from said reflected light; and
   a servo controlling step of turning said servo control OFF when said error is a predetermined value or more, and performing follow-up control of said laser beam when said error is not a predetermined value or more.

13. The emission control method according to claim 8, wherein said servo control is a track servo control for causing said laser beam to follow the tracks of said storage medium.

14. The emission control method according to claim 8, wherein said superimposing step comprise a step of superimposing said high frequency signal during erasing to said drive current according to one of the operations of writing, reading and erasing data in/from said storage medium.

15. An optical storage device for writing and/or reading data to/from a storage medium using a laser beam, comprising:
   a light source for emitting the laser beam onto said storage medium;
   a servo controller for performing follow-up control of said laser beam on said storage medium according to the reflected light of said storage medium;
   a light source driver for applying drive current to said light source for said writing and/or reading;
   a signal generator for generating high frequency signals to be superimposed onto said drive current; and
   a controller for judging whether the laser emission of said light source is unstable from the servo control status by said servo controller, and superimposing said high frequency signals onto said drive current when judging that the laser emission is unstable;
   wherein said controller counts the number of times when said servo control became OFF, and judges whether said laser emission is unstable according to said count value.

\* \* \* \* \*